United States Patent [19]

Grosseau

[11] 3,778,082

[45] Dec. 11, 1973

[54] SUSPENSIONS FOR VEHICLES
[75] Inventor: Albert Grosseau, Chaville, France
[73] Assignee: Societe Anonyme Automobiles Citroen, Paris, France
[22] Filed: Sept. 13, 1972
[21] Appl. No.: 288,555

[30] Foreign Application Priority Data
Sept. 27, 1971  France .............................. 7134709

[52] U.S. Cl. .............................. 280/124 B, 267/57
[51] Int. Cl. ............................................ B60g 11/60
[58] Field of Search .................... 280/124 B; 267/57

[56] References Cited
UNITED STATES PATENTS
3,615,081  10/1971  Ravenel ............................... 267/57
3,085,817  4/1963  Krause ........................... 280/124 B Primary Examiner—Philip Goodman
Attorney—Richard K. Stevens et al.

[57] ABSTRACT

The suspension comprises an arm fast to a hub mounted on the body of the vehicle by means of a transverse rotary bearing, the hub being anchored to the end of a transverse torsion bar arranged in a tubular transverse member. The suspension comprises elastic means with variable flexibility arranged between the body and at least one arm fast in rotation to the tubular transverse member, the elastic means exerting on the arm an effect tending to oppose oscillating movement of the wheel upwardly with respect to the body. The suspension is particularly useful as a rear suspension for a light vehicle with front wheel drive.

13 Claims, 4 Drawing Figures

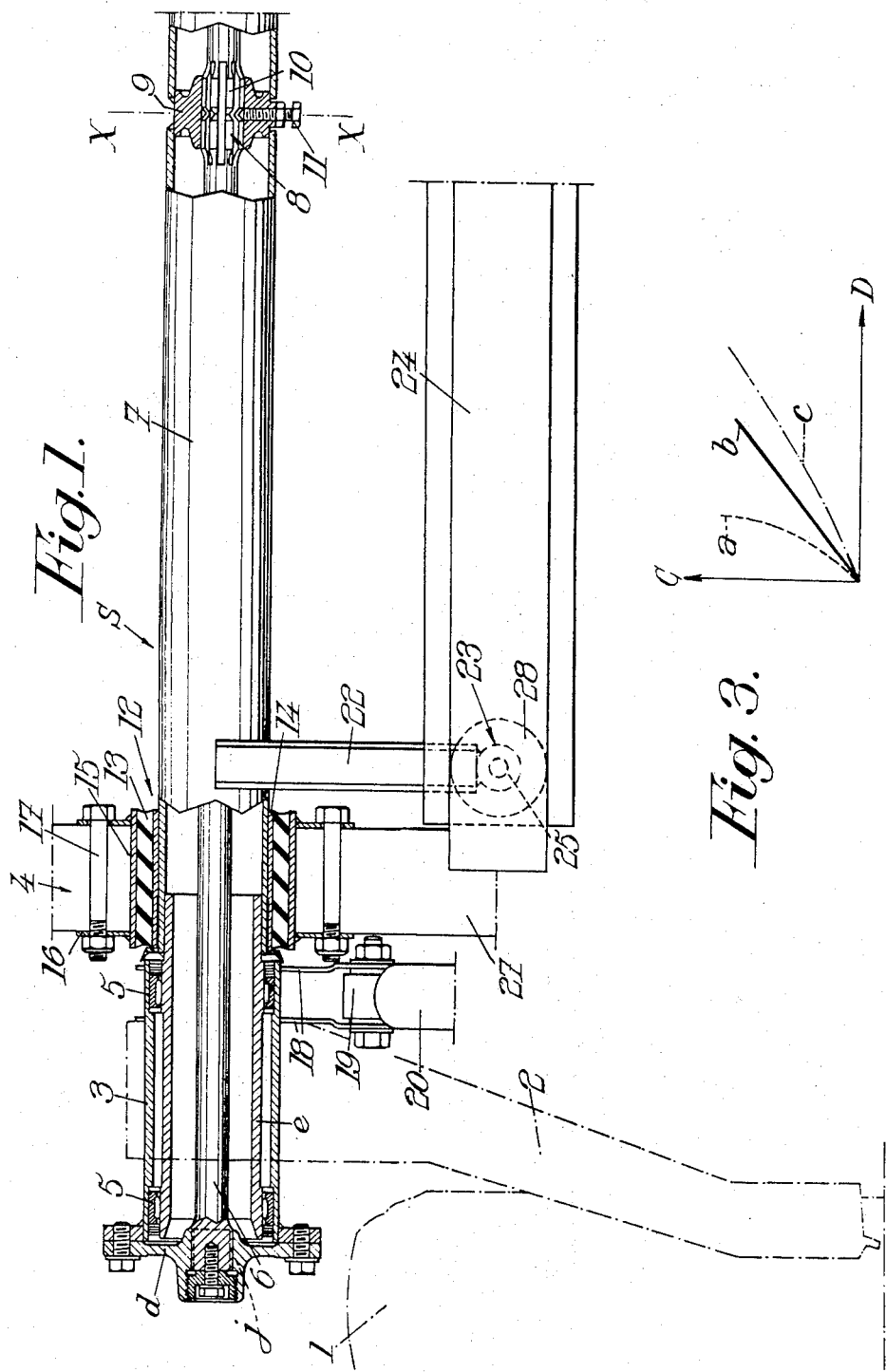

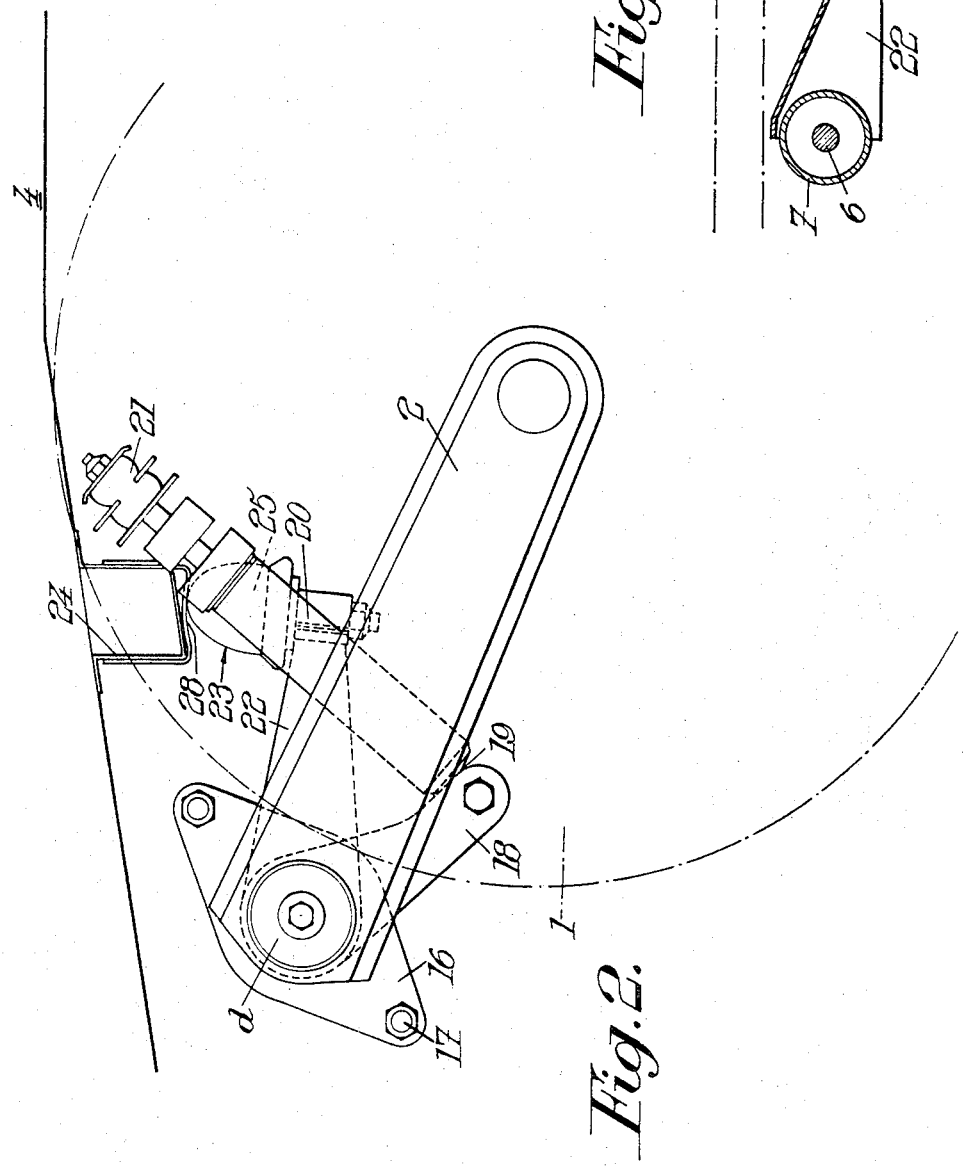

SUSPENSIONS FOR VEHICLES

The invention relates to suspensions, for vehicles, of the type in which the wheels of a same wheel train are each borne by a substantially horizontal wheel arm fast to a hub which is mounted on the body of the vehicle by means of a transverse rotary being, the hubs of two wheel arms of a same wheel train being anchored, respectively, to the ends of a transverse torsion bar positioned inside a tubular cross member to which it is anchored by a median zone, which cross member is itself mounted on the body, in the neighbourhood of its ends, by means of supports, the transverse rotary bearings which bear the hubs being positioned between each hub and the tubular cross member.

It is an object of the invention to render these suspensions such that they respond to the various exigencies of practice better than hitherto and, especially, that they have a flexibility variable as a function of the load, for simultaneous vertical oscillations in the same direction, of the two wheels of a same train and a constant flexibility for pure rolling oscillations, that is to say for symmetrical opposite angular oscillations of the two suspension arms of the same train.

According to the invention, a suspension for a vehicle of the above-defined type, is characterised by the fact that it comprises elastic means of variable flexibility positioned between the body and at least one connecting arm rigid with the tubular transverse member, said elastic means of variable flexibility being adapted to exert on the connecting arm an action tending to oppose to an oscillating movement of the wheels upwardly with respect to the body.

Preferably, there are provided two connecting arms arranged in the vicinity of the ends of the tubular transverse member.

The elastic means of variable flexibility can be fixed either on the connecting arm rigid with the tubular transverse member, so as to be supported on a portion of the body, or on the body so as to be supported on the connecting arm rigid with the tubular transverse member.

Advantageously, the elastic means of variable flexibility are constituted by at least one element of elastomeric or similar material, of such a shape that its flexibility diminishes as its crushing increases.

The portion of the body co-operating with the elastic means of variable flexibility is advantageously constituted by a sectional member extending transversely and fixed to two longitudinal runners.

The invention consists, apart from the features disclosed above, of certain other features which are preferably used at the same time and which will be more explicitly considered below with regard to preferred embodiments of the invention which will now be described in more detailed manner with reference to the accompanying drawings but are not to be considered as in any way limiting.

In the drawings:

FIG. 1 is a partial plan view, with portions removed, of a suspension constructed according to the invention;

FIG. 2 is a partial view in elevation of the suspension of FIG. 1;

FIG. 3 is a diagram establishing correspondence between the oscillations plotted as abscissae and the loads plotted as ordinates, for a suspension according to the invention;

FIG. 4, lastly, shows a modification of the elastic means of variable flexibility.

Before undertaking the description proper of the invention, there will be recalled several general concepts which will facilitate the understanding of the invention.

The rigidity $k$ of a spring or of a suspension is equal to the ratio of variation in load $\Delta C$, applied to the spring or to the suspension, to the variation in oscillation $\Delta D$ produced by this variation in load: $k = \Delta C/\Delta D$.

The flexibility $f$ is equal to the inverse of the rigidity $k$, that is to say $f = 1/k$.

If $m$ is the weight suspended, the inherent period of oscillation of a suspension of which the rigidity is $k$ depends essentially on the ratio $\sqrt{k/m}$.

It is seen immediately that a variation in the weight $m$ suspended causes, if rigidity $k$ or its inverse the flexibility $f$ is constant, a variation in the inherent period of the suspension.

A suspension with a flexibility variable as a function of the load and of which the flexibility diminishes when the suspended weight increases, enables the reduction, if not the elimination, of the variations of the inherent suspension periods. Whatever the load, the suspension will retain a period of oscillation in the neighbourhood of a predetermined optimal value.

This is particularly advantageous for the comfort of the passengers of an automobile vehicle, especially of a vehicle of light structure for which the variation of suspended mass is considerable according as the vehicle is empty or full.

In the case of a vehicle with a front wheel drive, of which the load variations are most noticeable at the rear, there will be selected, preferably, a front suspension with a constant flexibility, whilst the rear suspension will be of variable flexibility, the rear flexibility diminishing when the deflexion or oscillation increases. When the vehicle effects a pure rolling motion, for a given angle of bank, a transfer of load will take place from one side of the vehicle to the other side. This transfer of load to the side of the vehicle which is most loaded, will be distributed between the front and the rear according to the ratio of the rolling rigidities of the front and rear suspensions. Through this fact, the transfer to the rear wheel of the most loaded side, that is to say, in the case of cornering, the rear wheel on the outside of the bend, increases with the load of the vehicle for a same banking angle, since the rear rigidity increases with the load.

The steering power of a tyre, all things being otherwise equal, diminishing when the load supported by the tyre increases, there will be obtained a relative modification of the steering powers of the front and rear tyres, the steering power of the rear tyre becoming less than that of the front tyre. Thus, from under-steering in the absence of load (predominance of the steering power of the rear tyres), the vehicle will become over-steered at load (predominance of the steering power of the front tyres), which is certainly prejudicial to safety. The driver of the vehicle, in fact, is essentially sensitive to the banking angle and adjusts his driving as a function of this angle; now with the phenomenon recalled above, according as the vehicle is loaded or not, for a same banking angle, the behaviour of the said vehicle will be different, so that it will be very difficult for the driver to determine how to adjust his driving.

It is therefore essential to provide a suspension whose rigidity increases with load for simultaneous vertical oscillations in the same sense, of the wheels of a same wheel train of which the rigidity on banking remains constant.

Referring to FIGS. 1 and 2, there can be seen a suspension S for the rear wheels 1 (of which only one is shown) of an automobile vehicle. The vertical plane passing through the longitudinal axis X—X of the vehicle is a plane of symmetry for the suspension S. Each wheel 1 of the rear train is borne by an arm 2 having a length greater than the radius of the wheel and fast to a hub 3 which is mounted on the body 4 of the vehicle by means of a transverse member 7 and of a transverse bearing 5 constituted, for example, by the assembly of two needle bearings or two cylindrical roller bearings.

The hubs 3 of the two arms 2 are anchored in known manner, by a disc $d$ fixed on each hub, respectively, to the ends provided with grooves $j$ of a transverse torsion bar 6, positioned inside a tubular transverse or cross member 7 and anchored to the latter by a median zone 8.

In the embodiment of FIG. 1, the transverse member 7 comprises two elements aligned and welded each to an anchoring sleeve 9 provided internally with grooves for the passage of splines 10 which are formed in the median zone 8 of the torsion bar 6. A screw 11 is provided to prevent the bar 6 from being displaced inside the sleeve 9.

In a modification, the torsion bar 6, instead of forming a single part as in FIG. 1, could be constituted by two aligned elements, each element having a length equal to half the length of the bar 6.

The cross member 7 is mounted on the body 4, in the vicinity of its ends, by means of supports 12. In the embodiment of FIG. 1, the supports 12 are constituted by a unit 13 of elastomeric material which has a tubular shape enabling it to be positioned around the cross member 7. This unit 13 can be adhered to the cross member 7 and to elements fast to the body 4 or, as shown, adhered to an inner metallic sleeve 14 and to an outer metallic sleeve 15, which sleeves are then fixed rigidly to the cross member and to the body. The outer sleeves 15 comprises lugs 16 fixed by bolts 17 or the like to the body 4, whilst the inner sleeve 14 is driven "hard" on to the transverse member 7. Since the tubular unit 13 can be deformed by torsion, the transverse tubular member 7 can turn around its axis with respect to the body 4. The support 12 shown in FIG. 1 is economical and of simple manufacture and enables filtering of the shocks jolted by the wheel, which are not transmitted to the body.

However, the torsion action of the unit 13 is not absolutely indispensable and the support 12 could be constituted by a device enabling the transverse member 7 to turn freely, without having to overcome a resistance to torsion of said support 12. The latter could be constituted for example, by an elastic bearing of the fluid-block type (sleeve of elastomeric material, lined with grease, enabling pivoting) or by a needle bearing.

In any case, when the support 12 is essentially constituted by a sleeve 13 working in torsion, this sleeve can have reduced dimensions.

The transverse rotary bearings 5, bearing hubs 3, are positioned between each hub and a stub-shaft $e$ fixed rigidly to the tubular transverse member 7 and extending from the support 12 to the outside. In a modification, the stub-shaft $e$ could form an integral portion of the transverse member 7 which would be extended therefore beyond the supports 12.

Each hub 3 bears, rigidly fixed, two longitudinal tabs 18 spaced from one another in the transverse direction, extending from the same side as the arm 2 and situated between the latter and the support 12. The space comprised between the tabs 18 is adapted to receive the head 19 of a damper 20 at which the other end 21 (FIG. 2) is connected to the body 4.

Two longitudinal arms 22, fast in rotation to the tubular transverse member 7, are provided in the vicinity of the ends of the latter and are situated, in the axial direction of the transverse member 7, between the supports 12. These arms 22 are advantageously each constituted by a rectilinear U-shaped sectional element, extending in the same direction as the arm 2. As seen in FIGS. 2 and 4, the height of this sectional element diminishes in proportion as it recedes from the transverse member 7. The end of this sectional element which is remote from said transverse member 7 bears elastic means 23 of variable flexibility, adapted to be supported on a transverse sectional element 24 of the body.

In a modification, there could be a single central longitudinal arm 22 or, in another modification, more than two arms.

The arm 22 could extend from one side to the other in the longitudinal direction of the transverse member 7 and carry, at its two ends, elastic means with variable flexibility arranged respectively above and below said arm, said elastic means being adapted to cooperate with corresponding stops.

In the embodiment of FIGS. 1 and 2, the elastic means of variable flexibility are constituted by a stop of elastomeric material 25, in the shape of a paraboloid of revolution of which the top is adapted to be supported against the abovesaid sectional element 24, the base of the paraboloid being turned towards the arm 22. More generally, the shape of the stop is such that the sections of this stop, along the planes parallel to the middle support surface of the stop, are non-decreasing from the summit towards the base. The flexibility of this stop diminishes as crushing increases.

In the embodiment of FIG. 4, the abovesaid elastic means 2 are constituted by a buffer or cushion of elastomeric material 26 formed of superposed rings 26a, the flexibility of this ushion diminishing when crushing of the cushion increases.

The elastic means of variable flexibility 23 could be constituted by several stops such as 25, spaced along the longitudinal direction of the arm 22 and adapted to come successively into play when the amplitude of oscillation increases.

The stops of elastomeric material could also be replaced by springs arranged in parallel, with constant flexibilities but different from one spring to the other, the springs being adapted to enter successively into play according to the amplitude of the oscillation of the suspension.

The transverse sectional element 24 has a U-shaped section of which the two parallel wings are vertical and of which the horizontal portion is turned downwardly, the sectional element 24 extending between two longitudinal runners 27 and the body 4, to which it is fixed.

At the level of the elastic means 23 of variable flexibility, a seat 28, fixed on the sectional element 24, is provided to cooperate with the abovesaid elastic means 23. In the case where these means are constituted by the stop 25, the seat 28 has a dish-shaped concave portion, adapted to receive the top of the said stop 25.

In FIG. 3, there are shown the curves giving, for a given deflection D, the load C applied to the various elastic means or to the suspension. The curve $a$ in dashed line represents the law of flexibility of elastic means 23 with variable flexibility, said curve $a$ having a concavity turned towards increasing loads. The straight full line $b$ represents the law of flexibility of the torsion bar 6; this flexibility is constant and corresponds to the slope of said straight line $b$.

The curve $c$ in a mixed line represents the law of flexibility of the suspension according to the invention, in which the torsion bar 6 and elastic means 23 with variable flexibility are mounted in series, for vertical movements in the same sense of the two wheels of a same train.

The operation of the suspension according to the invention is as follows.

Any vertical force, especially the weight of the vehicle, applied to the body 4 and distributed substantially in the same manner on the two wheels of the train equipped with the suspension according to the invention, tends to raise or lower the wheels 1 with respect to the body, causing their arms to turn around bearings 5 of their hubs 3.

This rotation is transmitted to the ends of the bar 6 which undergoes torsion between said ends and its central portion anchored in the sleeve 9. The reaction of the latter generates on the transverse member 7 a moment of rotation transmitted to the arm 22, so that there results a force applied to the elastic means 23. The oscillations due to the torsion bar 6 and to the elastic means 23 are added to one another. On vertical oscillations of the vehicle, the law of flexibility of the suspension will hence be represented by the curve $c$ of FIG. 4.

It must be noted that, if the tubular transverse member 7 has a certain flexibility in torsion, the deflexion for a given load will be greater than the sum of the deflexions due to the bar 6 and to the elastic means of variable flexibility 23.

If the supports 12 work in torsion on angular oscillations of the transverse member 7, their rigidity will be added to that of the elastic means 23 of variable flexibility; in other words, for the same load, the deflexion will be slightly less than that which would be obtained if the supports 12 permitted free rotation of the transverse member 7. In any case, each support 12, even when it works in torsion, is selected so as to have a very great flexibility, so that said support 12 practically never intervenes in the suspension relationship.

In the case of banking, the tilting of the body tends to raise one wheel and to lower the other wheel all the more with respect to the body, by causing the arms to turn in opposite directions. These rotations are respectively transmitted to the two ends of the torsion bar 6, of which the two halves comprised between the ends of the bar and the sleeve 9 twist by equal and opposite angles, so that the sleeve 9, and consequently the transverse member 7 and the arm 22, do not undergo any angular displacement. The relationship of the suspension on banking is hence represented by the straight line $b$ and the flexibility on banking is less than the flexibility on vertical oscillations.

The suspension according to the invention is of simple construction, whilst having the properties already mentioned, namely variable flexibility for vertical oscillations and a constant flexibility for banking movements. As a result there is good roadholding in a vehicle equipped with this suspension and comfort which is constant or varies little as a function of load.

In addition, when the supports of the transverse tubular member are constituted by parts of elastomeric or similar material, the shocks and noises of driving are filtered by these supports. It will also be noted that the life of such supports of elastomeric material will be considerable since they do not work (or very little) in torsion, the rotary maintenance of the transverse member 7 being ensured essentially by the one or more arms 22 and the elastic means of variable flexibility 23.

I claim:

1. In a vehicle, a suspension in which the wheels of a same wheel train are each borne by a substantially horizontal wheel arm fastened to a hub which is mounted on the body of the vehicle by means of a transverse rotary bearing, the hubs of two wheel arms of a same wheel train being anchored at the respective ends of a transverse torsion bar positioned inside a tubular cross member to which it is anchored at a median zone, which cross member is itself mounted on the body in the vicinity of its ends, by means of supports, said transverse rotary bearings being positioned between each hub and the tubular cross member, at least one connecting arm rigid with the tubular cross member and elastic means of variable flexibility positioned between the body and connecting arm, said elastic means being adapted to exert on the connecting arm an effect tending to resist oscillating upward motion of the wheels with respect to the body.

2. Suspension according to claim 1, wherein said elastic means are adapted to work under compression.

3. Suspension according to claim 2, wherein said elastic means are fixed on said connecting arm and are adapted to be supported on a portion of the body.

4. Suspension according to claim 2, wherein said elastic means are fixed to the body and are adapted to be supported on said connecting arm.

5. Suspension according to claim 1, comprising two said connecting arms, arranged in the vicinity of the ends of said cross member.

6. Suspension according to claim 2, wherein said elastic means are constituted by at least one element of elastomeric or similar material of such shape that its flexibility diminishes as its compression increases.

7. Suspension according to claim 6, in which the element, of plastics or similar material, is constituted by a stop including a top and a base, wherein the stop has a shape such that its cross sections along planes parallel to the mean support surface of the stop are non-decreasing from the top towards the base.

8. Suspension according to claim 6, wherein said element is constituted by a cushion formed of superposed rings.

9. Suspension according to claim 3, wherein the portion of the body on which said elastic means are supported is constituted by a transverse sectional member fixed to two longitudinal runners of the body.

10. Suspension according to claim 1, wherein the supports of the tubular cross member are constituted by sleeves of elastomeric material engaged around the cross member, whose inner surface is connected to the cross member or to a member fast to the latter and whose outer surface is connected to the body or to a member fast to the latter.

11. Suspension according to claim 1, wherein the supports of the tubular cross member are constituted by sleeves of elastomeric material of the fluid-block type, adapted to permit free rotation of the tubular cross member with respect to the body.

12. Suspension according to claim 1, wherein on each side of the vehicle, said elastic means are constituted by several elastic members, of constant but different flexibilities, arranged so as to enter successively into play in the course of the rotation of said connecting arm.

13. Suspension according to claim 1, wherein each said connecting arm extends on both sides of the tubular cross member and comprises, at its two ends, elastic means of variable flexibility adapted to cooperate with complementary supports provided on the body of the vehicle.

* * * * *